United States Patent [19]

North

[11] Patent Number: 4,865,144
[45] Date of Patent: Sep. 12, 1989

[54] POWER STEERING SYSTEM HAVING SIMULATED TORQUE SENSOR

[75] Inventor: James A. North, Farmington Hills, Mich.

[73] Assignee: Eaton Corporation, Cleveland, Ohio

[21] Appl. No.: 188,506

[22] Filed: Apr. 29, 1988

[51] Int. Cl.⁴ .............................................. B62D 5/04
[52] U.S. Cl. .................................................. 180/79.1
[58] Field of Search ...................... 180/141, 142, 79.1, 180/161, 162; 307/10 R; 364/424; 318/615, 625, 628, 638, 652, 671, 564, 587

[56] References Cited

U.S. PATENT DOCUMENTS 3,011,579  12/1961  Milliken .............................. 180/142

FOREIGN PATENT DOCUMENTS 261325  3/1988  European Pat. Off. ............. 180/142
67265   4/1985  Japan .................................... 180/142
12461   4/1987  Japan .................................... 180/142

Primary Examiner—Mitchell J. Hill
Attorney, Agent, or Firm—C. H. Grace

[57] ABSTRACT

A closed-loop torque demand power steering system suitable for large off-highway and other vehicles has no mechanical linkages or hydraulic connections entering into the driver's cab. A torque demand signal is produced electronically without any separate electromechanical torque sensor. Upon starting, the system provides synchronization between steering and steering wheels without initial corrective motion of either member. During operation the direction of the steered wheels does not drift relative to the position of the steering wheel. The circuit includes protection against spurious steering signals that might otherwise occur if the steering is moved back and forth mechanically on a transition boundary of a position sensor. In the event of certain types of failure of its primary steering system it automatically changes over to an open-loop secondary steering system that is controllable by the same steering wheel, and that has components in common with the primary system.

6 Claims, 2 Drawing Sheets

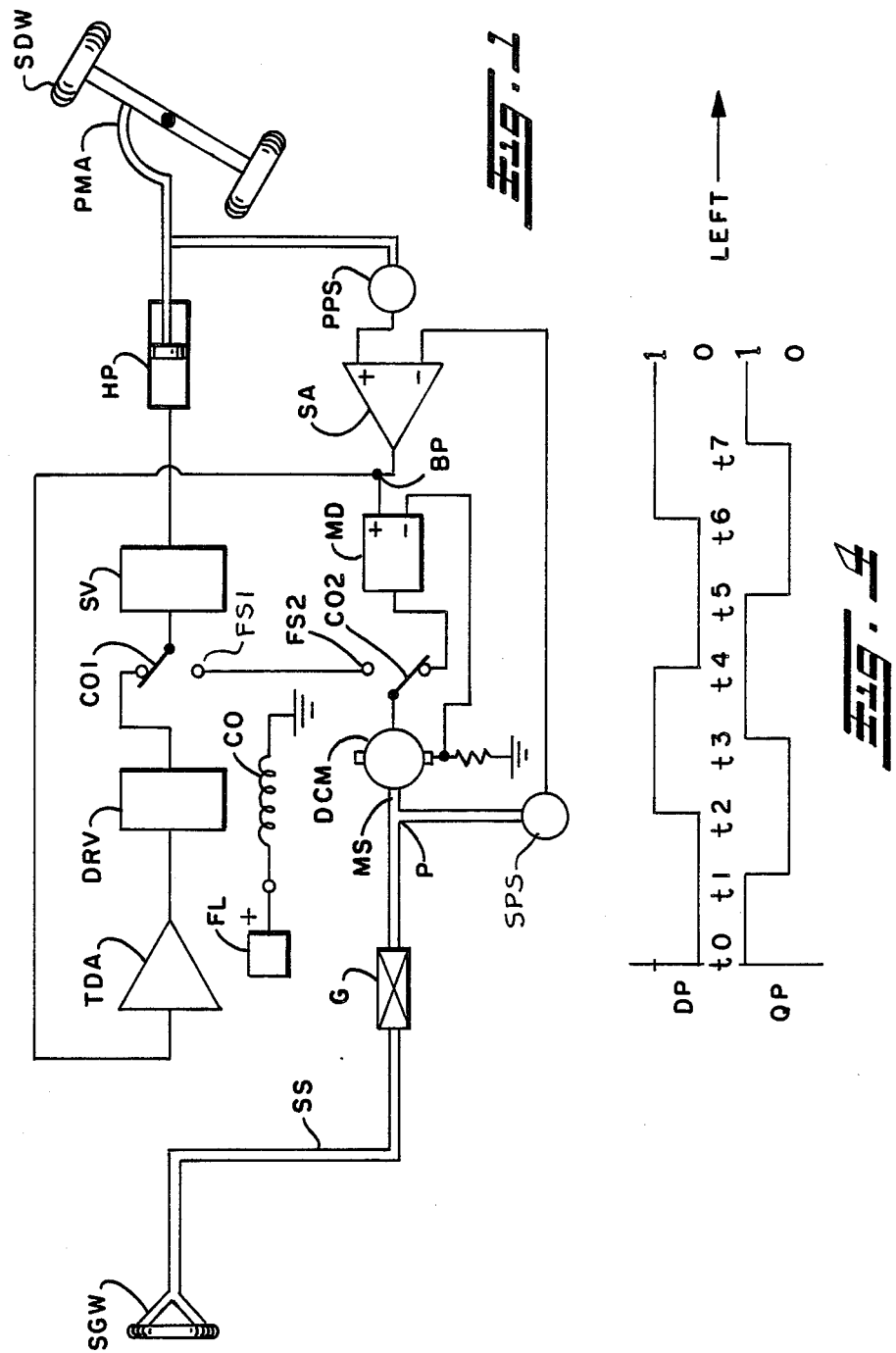

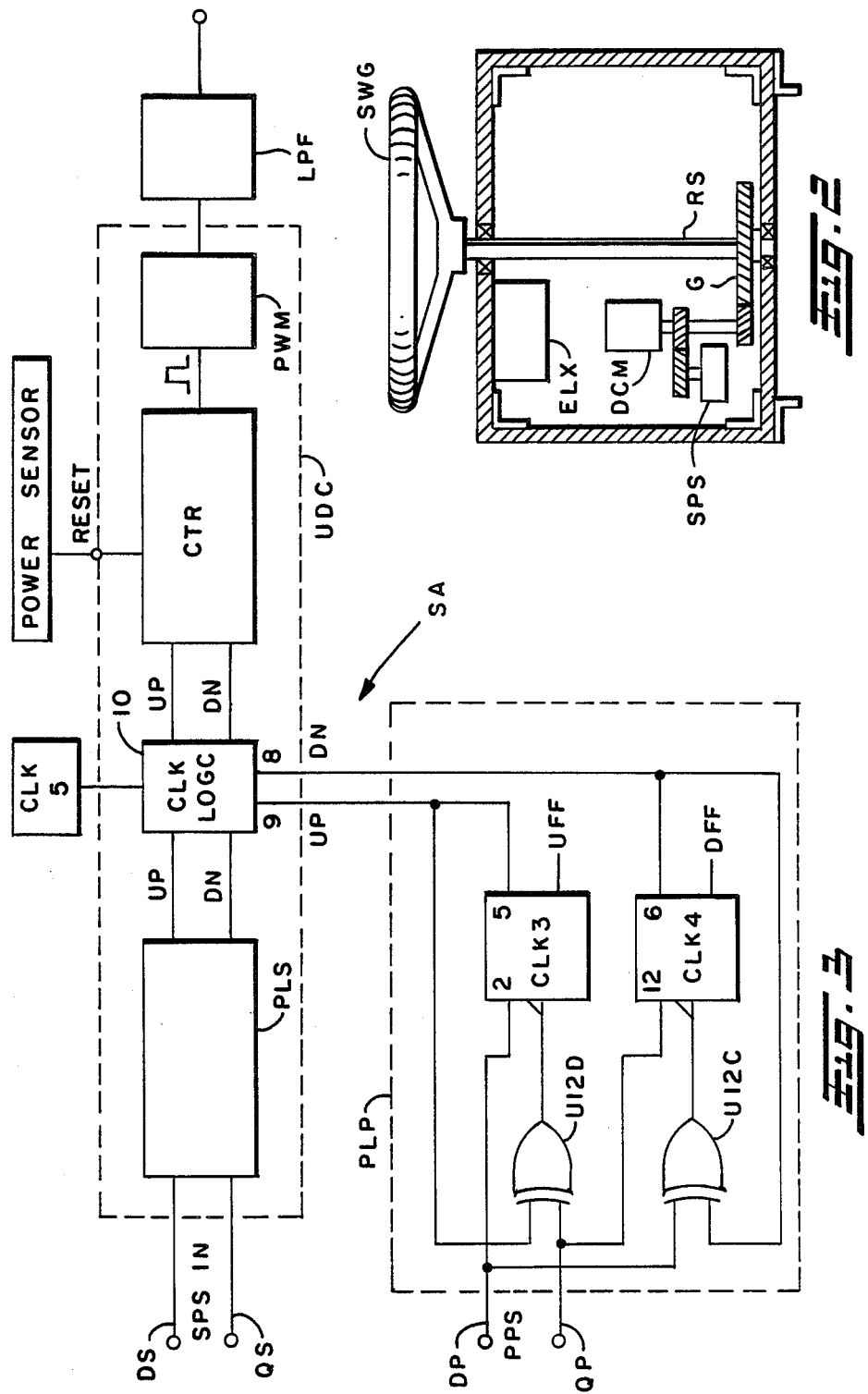

POWER STEERING SYSTEM HAVING SIMULATED TORQUE SENSOR

BACKGROUND

The field of the invention is power steering apparatus for vehicles, especially those whose steered wheels are turned by one or more hydraulic actuators, and that are primarily for off-highway applications such as agriculture or earth moving. Many prior power steering systems for use in such vehicles have hydraulic hoses and/or mechanical linkages entering into the cab of the vehicle. In another type, which can be called a steer-by-wire system, only electrical cables are permitted in the driver's cab.

For steer-by-wire systems, the following three approaches among others are possible: (a) open-loop control of steered wheel motion based upon the velocity of the steering wheel; (b) direct position control of the steered wheels from the steering wheel; and (c) torque demand control, wherein the torque at the steered wheels is a more powerful copy of the torque applied to the steering wheel by the the operator. The torque demand control systems, type (c), have the advantage over (a) and (b) of feeling closest to the way familiar power steering systems feel to the driver.

One steer-by-wire system of type (c), disclosed in a co-pending application of the same assignee as this invention, utilizes an electric motor in the cab to provide reaction torque to the steering wheel and an electromechanical torque sensor in the cab to produce torque demand signals for steering.

SUMMARY OF THE INVENTION

The present invention is primarily a fly-by-wire system of the torque demand type (c) above, in a closed loop circuit. However, it does not have a mechanical or electromechanical torque sensor; instead, it produces a torque demand signal by electronically simulating a torque sensor. To do so, it senses the current to an electric motor whose primary purpose is to provide a reaction torque. The motor's torque opposes the torque applied to the steering wheel (or other steering device) by the driver.

The invention includes also an open-loop secondary steering system of type (a) above, which comes into use automatically if the closed-loop primary steering system fails.

One object of the invention is to provide a vehicular power steering system of the type responsive to torque demand and having no mechanical linkages between the portions of the system that are in the cab (or control area) of the vehicle and the portions outside the cab.

Another object is to require no hoses or other hydraulic components in the cab.

An object is to provide a torque demand signal by electronically performing the functions of a torque sensor.

An object is to have less drift (precession) between the steering wheel and the steered wheels of the the vehicle.

An object is to provide a logic circuit that is unresponsive to spurious signals arising from undesired back-and-forth movement of a position sensor at a signal change boundary.

An object is to have no stops limiting the rotation of the steering wheel other than those that are imposed by reflection of the stops on the steered wheels.

An object is to have new synchronization occur upon startup, so that neither the steered wheels nor the steering wheel moves initially upon startup.

An object is to for the torsional feel to the driver to be smooth and stable, and for reaction from the road wheels to be felt in the steering wheel.

An object is to provide both a primary steering system and a secondary steering system capable of controlling the vehicle from the same steering wheel, and means for automatically switching to the secondary system if a failure occurs in any of various electrical portions of the primary system.

BRIEF DESCRIPTION OF FIGURES

FIG. 1 is a simplified block diagram of the preferred embodiment of the invention.

FIG. 2 is a cross-sectional view of a portion of the system in the cab of a vehicle.

FIG. 3 illustrates a portion of an electronic module SA of the system.

FIG. 4 is a timing diagram showing direct and quadrature signals produced by an incremental position sensor.

DESCRIPTION OF A PREFERRED EMBODIMENT

Primary Steering System

Inner Loop of the Primary System.

The inner loop includes a DC motor DCM, having a motor shaft MS, as shown in FIG. 1. The inner loop also comprises a motor shaft position sensor SPS, which is mechanically coupled to the motor shaft MS, a servo amplifier SA, and a transistor motor drive amplifier MD.

Briefly, the inner loop, an electrical servo, functions as both a reaction torque controller and a position controller. It controls the reaction torque produced by the motor DCM so that it opposes the steering torque applied by the driver of the vehicle. It also controls the position of the motor shaft MS so that it copies the position of the steered wheels SDW.

For reaction torque control purposes the input command to the inner loop is a mechanical input from a gearbox G at one end of the motor shaft MS. The coupling could instead be accomplished by a toothed or smooth belt and pulley system or other devices, the choice not being relevant to the gist of the invention. For purposes of controlling the position of the motor shaft MS its input command is an electrical signal from a Pitman position sensor PPS, which is input to the servo amplifier SA.

In FIG. 1 a differential amplifier symbol having inverting and non-inverting inputs is used to represent SA, because that is descriptive of the functions of SA; however, digital circuits are preferably employed to perform the functions. The sensors SPS and PPS are incremental position sensors that provide pulse train input signals to an electronic up/down counter UDC. Counter UDC, which is part of the servo amplifier SA, is shown on FIG. 3.

The position sensors SPS and PPS and circuits for employing them are commercially available in the prior art. Electrical pulses are produced upon rotation of the sensor's rotor, a pulse being output each time the rotor turns through a small angle. The direction of rotation is determined by providing additional pulses in offset phase relationship, such as quadrature relationship, to the direct pulses. One direct pulse and one quadrature pulse constitute a set of pulses. The phase or timing of the quadrature pulses relative to the direct pulses indicates the direction. Sets of pulses from the sensor PPS representing a left turn increment the digital counter UDC, and sets of pulses from PPS in a right turn direction decrement it. On the other hand, left turn pulse sets from the sensor SPS decrement the counter UDC, and right turn pulse sets from SPS increment it.

The function of logic circuit PLP (FIG. 3) is to convert the two incremental input signals that it receives (i.e., direct signals at terminal DP and quadrature signals at terminal QP). Logic circuit PLP converts them into the pulse increment signals (at terminal 5, UP) and the pulse decrement signals (at terminal 6, DN) that are required by the up-down counter module (UDC). The logic circuit performs this function while ignoring spurious multiple counts even if the mechanical system moves back and forth undesirably about a logic transition position of the position sensor.

The logic of circuit PLP is sequential as opposed to merely combinational. Timing diagrams of FIG. 4 show left turn signal output by the sensor PPS; they are converted by PLP to create an "increment" pulse train on the UP terminal 9 of UDC while maintaining unchanged the logic state signal on the DN terminal 8. This is true for an initial condition of either 1 or 0 on the UP terminal 9 or the DN terminal 8.

Mechanical back-and-forth movement that creates multiple signal transitions at only the direct (DP) terminal or only the quadrature (QP) terminal do not create state changes at the UP or DN count terminals 9, 8, because sequential transitions at both direct and quadrature terminals are required to cause a state change at an UP or DN terminal.

Referring to FIG. 3, the direct and quadrature signals from sensor PPS are input to terminals DP and QP respectively of the circuit PLP. Circuit PLP includes two D flip-flops called UFF and DFF, and two exclusive OR gates called U12D and U12C. Terminal DP is connected to a terminal 2 of UFF and to one input terminal of gate U12C. Terminal QP is connected to a terminal 12 of DFF and to one input terminal of gate U12D.

An output terminal 5 of UFF is connected to the other input of U12D An output terminal 6 of DFF is connected to the other input of U12C. The output of U12D is connected to a clock terminal CK3 of UFF. The output of U12C is connected to a clock terminal CK4 of DFF. The output terminal 5 is also connected to an up-counting input terminal 9 of the up-down counter UDC. The output terminal 6 is also connected to a down-counting terminal 8 of UDC.

The operating characteristics of the well-known type of flip-flop used for UFF are as follows. When a signal at the clock terminal CK3 goes high (logic 1) the logic status of terminal 2 is sampled and replicated at terminal 5. The sampling of terminal 2 takes place at the leading edge of each new high signal on the clock terminal CK3. For example, if terminal 2 has a high when the clock goes high, 5 gets a high. Thereafter, 5 holds that high until at least the leading edge of the next new high on the clock terminal; at that time the data on 2 is again sampled and the new value, whether it be a high or a low (logic 0), is replicated at terminal 5. The flip-flop DFF operates in the same way.

The signals at terminals DP and QP of FIG. 3 are illustrated in FIG. 4. Leftward turning of the steered wheels produces pulse transitions in the following time sequence:

t0, direct goes low; t1, quadrature goes low; t2, direct goes high; t3, quadrature goes high; t4, direct goes low; t5, quadrature goes low; t6, direct goes high; t7, quadrature goes high.

Conversely, rightward turning results in:

direct going high; quadrature going low; direct going low; quadrature going high; direct going high; quadrature going low; direct going low; quadrature going high.

The logic states at various terminals are shown in Table 1, starting at a time shortly after t0 and before t1, and with an initial condition of logic zero at both terminal 5 and terminal 6. Rows of the table represent terminals (see FIG. 3); columns are time intervals (see FIG. 4); entries are logic states at the corresponding terminals and time intervals.

TABLE 1

|  | t0-t1 | t1-t2 | t2-t3 | t3-t4 | t4-t5 | t5-t6 | t6-t7 |
| --- | --- | --- | --- | --- | --- | --- | --- |
| DP | lo | lo | hi | hi | lo | lo | hi |
| QP | hi | lo | lo | hi | hi | lo | lo |
| CK3 | hi | lo | lo | hi,lo | lo | hi,lo | lo |
| CK4 | lo | lo | hi | hi | lo | lo | hi |
| 5 | lo | lo | lo | hi | hi | lo | lo |
| 6 | lo | lo | lo | lo | lo | lo | lo |

Operation of the circuit of UFF can be understood by considering the input signals at terminals DP and QP, and the resulting signals at terminals 5 and CK3. FIG. 4 and Table 1 are helpful in following the description.

t0-t1. In the time interval t0-t1, the signal at terminal 5 is in an assumed initial condition of 0 (low). As shown in FIG. 4, terminal DP has a low signal and QP has a 1 (high) signal.

t1-t2. At time t1, QP goes low. In this time interval, DP and terminal 5 are also low, as shown in the table above. The signal at clock terminal CK3 is controlled by the signals of terminals QP and 5 via the exclusive OR gate U12D. CK3 therefore goes low.

t2-t3. At time t2, DP changes to a high. Because the CK3 signal is still low, no clock signal pulse is applied to UFF. 5 remains low during t2-t3.

t3-t4. At time t3, QP changes to high. The gate U12D provides a high to CK3, whereupon the high that standing on DP is clocked into UFF. UFF changes the terminal 5 signal to a high. With highs on both QP and 5, the CK3 signal is changed to a low a short time after t3; a short upward pulse has occurred on K3. UFF maintains the high at terminal 5.

t4-t5. At time t4, DP changes to low. CK3 remains low because both 5 and QP are high. In the absence of a new clock pulse, terminal 5 stays high.

t5-t6. At time t5, QP changes to low. 5 is still high, so CK3 receives a high. This clocks into UFF the data at the DP terminal, which is low. The UFF produces a low at its terminal 5. With a low also at QP, CK3 goes low shortly after t5; a short upward pulse has occurred at CK3.

t6-t7. At time t6, DP goes high. Both QP and 5 remain low, so no clock pulse occurs at CK3. Terminal 5 remains low.

During the time t3–t7, terminal 5 has a high followed by a low, i.e., an up-going pulse. Terminal 5 is connected to input 9 of the controller chip UDC, so its pulse is counted by counter UDC. The count in UDC is incremented.

The output at terminal 6 remains low throughout the foregoing time sequence t0–t7. Although an up-going edge occurs at CK4 at time t2, the data at terminal 12 (from QP) is then low, so terminal 6 remains low. At time t3, when terminal 12 has a high, CK4 was already high and remains high, and so does not experience an up-going clock edge. At t6, when CK4 again goes high, the data at terminal 12 is low, so terminal 6 stays low. Thus, a continuous low signal is presented to the DN terminal 8 of UDC during a left turn. No counts occur to decrement the contents of UDC.

During rightward turning, the counter is decremented in a manner similar to the incrementing described above. Because the increment and decrement logic are symmetrical, for right turns the signal states of UFF and DFF and of U12D and U12C are reversed from those described for left turns. Right turn signals from PPS create a pulse train on terminal 6 of DFF, which is connected to the DN terminal 8 of UDC, and maintain unchanged the logic state on terminal 5 of UFF. During a right turn, the next-occurring signal transition at terminal QP following an up-going edge of signal at terminal DP, is a down-going edge (instead of an up-going edge, as would be the case in a left turn). The quadrature signals occurring during a right turn are 180 degrees different from those occurring during a left turn, where the reference phase in both cases is the phase of the direct signals.

The immunity of the circuit to undesired back and forth movement at a signal boundary can best be explained by example. The position sensor PPS (and SPS) in this embodiment includes a rotatable mechanical element that produces a pulse each time it rotates from one angular sector to the next (in response to steering). Pulses occur when the element rotationally traverses boundaries between contiguous angular sectors. If undesired movement were to produce one or more extraneous spurious pulses (up and down) of, for example, the DP signal after t1 and before t2, the train of signals at the output terminals 5 and 6 would not be affected. This is true because both 5 and QP would be low, so CK3 would remain zero; in the absence of an up-going edge of a clock pulse at CK3, the UFF would not change the logic state of its output terminal 5.

Moreover, the DFF flip-flop would remain at zero output state because, although CK4 would receive a pulse when DP produces the spurious pulse with 6 being zero, the 12 terminal of DFF would then be having a low from QP. The clock pulse at CK4 would merely clock in a zero from the 12 terminal to the 6 terminal, so there would be no change in signal at 6.

A module PLS within the commercially available counting device UDC receives direct signals at a terminal DS and quadrature signals at a terminal QS from sensor SPS. The module PLS has circuitry to convert these direct and quadrature signals into increment (UP) pulse signals and decrement (DN) pulse signals that are supplied to the counter CTR via clock logic circuit 10 to make CTR count up and count down. If desired the logic circuit of PLP described above can be employed in PLS also, to reduce back-and-forth signal change problems.

A 5 MZ clock oscillator CLK5 and a simple prior art clock logic circuit 10 are provided to feed pulses into the counter CTR from both of the sources of Pulse sets, SPS and PPS. The counter UDC is a digital device called a "Stepping Servo Controller" that is sold commercially as Model GL-1200 by Galil Motion Control, Inc., of Mountain View, Calif. It has a digital counter CTR capable of counting upward and downward in response to two sets of signals, e.g., a command set and a feedback set. It also includes a pulse width modulation circuit PWM for outputting periodic unipolar pulses whose pulse widths are modulated. These output pulses are lowpass filtered in a conventional filter LPF to enable them to serve as analog error signals.

The count in the counter CTR is reset to zero by a power sensor at a reset terminal of CTR upon interruption of power supply, so it has a count of zero upon starting of the vehicle. The count in CTR represents the difference, accumulated since the counter was reset to zero, between (a) the net change in position of the Pitman position sensor PPS and (b) the net change in position of the shaft position sensor SPS at the motor shaft MS in the cab.

If desired a velocity signal can also be provided. The preferred embodiment uses a sum of position feedback and adjustable velocity feedback (not shown) to control the current to the motor DCM.

The use of an incremental position sensor permits the steering wheel to synchronize automatically with the steered wheels at the positions existing when power is turned on, without corrective motion of either member. When the system is switched on with the steering wheel misaligned, the steering wheel's existing position is adopted as the "zero" or center position.

The incremental sensors also eliminate any drift between steered and steering wheels while the system is operating and permit high loop gain and high speed in the inner loop. The inner loop has a bandwidth of about 10 Hz, and is therefore dynamically faster than the outer loop described below.

As shown in FIG. 1, a shaft position sensor SPS, which is an incremental position sensor like PPS described above, is coupled to the motor shaft MS of the motor DCM so as to keep track of the rotational position of the shaft MS. When the shaft MS turns, the sensor SPS produces electrical pulses, which are conducted through directional logic circuits like those already described, to inputs of the counter CTR in UDC, (part of SA).

SPS pulses indicating rotation in one direction go to a down-counting input and those of the other direction to an up-counting input. PPS pulses, representing the position of the steered wheels SDW, are also received and counted at the inputs of the counter CTR, as described above. The difference between the numbers of up counts and down counts is of course the net count in CTR. The commercially available module UDC of which the counter CTR is a part contains the pulse width modulation circuits PWM that produce an output signal, which is converted to an analog error signal by the lowpass filter LPF following UDC.

The analog error signal is amplified in the servo amplifier SA, whose output is a terminal BP. This is a point from which the signal goes to both the outer loop, which will be described below, and the inner loop. Continuing with the inner loop, the signal at terminal BP is input to a transistor motor drive unit MD, whose output is connected through a fault switch FS to the armature terminals of the the motor DCM. MD has output of sufficient to enable it to drive the DC motor DCM to whose armature terminals it is connected. Motor DCM has a permanent magnet field, so it does not rely upon any externally supplied electrical power supply to produce its magnetic field. Current feedback is sensed across a resistor that is in series with the armature of the motor DCM, and is connected back to the transistor motor drive DA in a conventional manner. Other feedback techniques could be used instead.

Current from the motor drive MD causes the motor DCM to correct the position of its motor shaft MS so as to reduce the error signal to zero. The position of motor shaft MS is a copy of the position of the steered wheels SDW. The motor shaft MS connects a reaction torque to the gearbox (or belt, etc.) G to oppose the torque with which the driver is turning the steering wheel SGW.

Outer Loop of the Primary System.

The outer feedback loop comprises elements TDA, DRV, SV, HP, PMA, SDW, PPS and SA (FIG. 1). The steering wheel SGW is mounted on a rotatable steering shaft SS, which conveys the driver's steering torque to the gear box G. In the particular embodiment being described, which uses gears, the smaller gear of the pair of low-backlash helical gears G is mounted on the output shaft MS of the motor DCM. The larger gear is mounted on the steering shaft SS. Six to one is the speed step-down ratio and torque step-up ratio accomplished by the gear train G. The components SGW, SS, and G themselves are not in the outer loop, but they initiate a torque demand that becomes the input signal of the outer loop.

The simulated torque demand signal at point BP is amplified in a torque demand electronic amplifier TDA and in a servo valve driver amplifier DRV, and is applied to a hydraulic cylinder. The cylinder has a piston HP which moves in response to the command signal. Piston HP is linked for actuation of a Pitman arm PMA of the steering mechanism. Forces applied by the piston to the arm PMA turn the steered wheels SDW. The greater the torque with which the driver turns the steering wheel, the greater the torque that causes the steered wheels to turn.

Mounted in connection with the Pitman arm PMA is the Pitman position sensor PPS. It is an incremental pulse position sensor, described above, which produces direct and quadrature electrical signals that serve as a set of feedback signals of the outer loop. Those feedback signal are conducted to the cab, where they are connected to the pulse logic inputs PL of the servo amplifier SA, (FIGS. 1 and 3). Another set of inputs to the position regulator SA, connected to the input terminals MI, is described above.

From the servo amplifier SA an output signal at point BP, which depends upon the difference between the net directional input signals from SPS and PPS, goes to the input of the torque demand amplifier TDA (and the motor driver circuit MD).

Magnitude and direction of the driver's applied torque are represented by the electrical signal at the output BP of the servo amplifier SA. This can be realized by noting that the signal at terminal BP is a pre-amplification version of the output current from the motor drive unit MD, which feeds the armature of motor DCM. The motor's torque is proportional to that current. The signal at terminal BP, which therefore corresponds to the torque of the motor DCM, is used as an error signal and a torque command. Without requiring an electromechanical torque sensor, the system, via its outer loop, utilizes an electronically produced torque demand signal to control a multiplied torque for the steered wheels.

Analog signal processing in the signal path of the outer loop stabilizes the system. The outer loop's bandwidth and hence its speed of response are limited by heavy mechanical and hydraulic components rather than by its electronic circuits. Its bandwidth is typically about 3 Hz.

The steering wheel's limits of rotational travel are established by "reflection" of the mechanical stops of the steered wheels SDW, because in steady state the position of the steered wheels is continuously copied by the position of the steering wheel SGW. The position of the steered wheels is a zero-torque reference for displacements of the steering wheel.

Resilience at the steering wheel results from the load regulation of the motor DCM, and any torsional springiness that may be provided in the steering shaft and gear system SS and G down to the shaft MS of the motor DCM. If desired, further torsional resilience can be introduced on either or both sides of the place at which the shaft position sensor SPS picks off a measurement of the position of shaft MS. For example, a torsional spring can be located on the gearbox side of the SPS takeoff point P or on the DC motor side of that point.

The mechanical arrangement of components in the cab is best seen in FIG. 2. All cab components except the steering wheel SGW are enclosed in an open frame F, which is bolted to a stationary structural member of the cab. Electrical power and signal conductors connect from components in the frame F to a power source, a sensor, etc. The steering shaft SS enters the frame F from the top and is geared to the motor shaft MS of the motor DCM through the two gears G. Through another train of gears the position sensor SPS, which is fixedly mounted to the frame F, receives information at point P as to the rotational Position of shaft MS. An electronics module containing amplifiers etc. is also mounted inside the open frame F.

The primary system's operational torque at the steering wheel is typically 2.5 pound-feet. A torque of plus or minus five pound-feet would twist it by plus or minus 7.5 degrees, and call for maximum available torque in the described embodiment. The motor DCM has enough torque capability to normally prevent the operator from overpowering it.

Secondary Steering System

In the event of loss of electrical power, (or, if desired, other electrical or electronic equipment failure or sensor failure), the Primary steering system automatically defaults within a second to the secondary steering system. The secondary steering system is open loop. The hydraulic system including the servo valve SV must still be functional in order for the the secondary system to operate, so the engine must be running.

When the primary system fails the motor DCM can-act as a generator, as it requires no external excitation for its field. The device DCM is a permanent magnet dynamo, suitable for use as a motor or a generator, and having a conventional rotatable shaft MS. The steering shaft SS is always coupled through gears G to the permanent magnet motor DCM. Rotation of the steering wheel clockwise or counterclockwise generates a positive or negative voltage at the armature terminals of the machine DCM, of a magnitude that depends upon the rate of rotation.

The changeover from primary to secondary steering systems is accomplished by de-energization of a contactor CO, FIG. 1. When the electrical supply voltage (+ on FIG. 1) is low, the coil of contactor CO is de-energized. Thereupon contacts CO1 and C02 of CO connect the terminals of the permanent magnet motor DCM with the servo valve SV. Contacts CO1 and C02 also disconnect the motor drive amplifier MD from the armature terminals of motor DCM and disconnect servo drive amplifier DRV from servo valve V.

A fault logic circuit FL senses the system's supply voltage and interrupts current in the coil of contactor CO when that voltage is below a predetermined threshold. If desired the circuit FL can lock itself out in the usual manner to prevent re-closing of CO if supply voltage reappears; after a fault condition has been corrected the circuit can be reset by means of a pushbutton switch. Contacts FS1 and FS2 of CO provide electrical connections in which the terminals of the permanent magnet motor DCM and those of the servo valve SV are connected only to each other. The generated voltage of the machine DCM, which is a rate signal, is thus able to control the servo valve SV. The servo valve SV manages the hydraulic flow to the piston HP to control the steered wheels SDW during secondary system operation just as in primary system operation. Although in the preferred embodiment the motor DCM is a permanent magnet DC motor, other types of motors/generators that can generate voltage without external excitation can be used.

High input torque is required at the steering wheel to "back drive" the motor DCM, as is done in secondary system operation. Initial synchronization between the steering wheel and the steered wheels does not occur in the secondary system in this embodiment. Also, there is a dead band in the steering wheel action. These characteristics notwithstanding, in most circumstances the secondary steering system is expected to provide helpful control while the vehicle is brought to a stop and as a "limp home" feature.

The system comprises a first electrical circuit for steering control, a second circuit, for backup, and indirect means of determining the torque at the steering wheel, which determines the basic amount of steering to apply to the wheels.

I claim:

1. Power steering apparatus for a vehicle having a cab, a steering wheel and steered wheels comprising:
   means communicating with said steered wheels for sensing their position and for producing a first electrical signal capable of indicating changes in said position;
   steering wheel coupling means mechanically connected with the steering wheel for movement by said steering wheel;
   means communicating with said coupling means for sensing its position and for producing a second electrical signal capable of indicating changes in the position of the coupling means
   comparison means receiving said first and second electrical signals for determining the difference between the changes in positions of the steered wheels and the steering wheel coupling means and for providing an error signal dependent thereupon;
   first means receiving said error signal and connected with said steered wheels for changing the position of the steered wheels to reduce said error signal; and,
   second means receiving said error signal and connected for providing current to electric motor means;
   said electric motor means having a motor shaft and receiving said current and operable thereby for controlling the position of said motor shaft;
   means connecting said motor shaft with said steering wheel coupling means for providing a reaction torque to the steering wheel;
   whereby no mechanical or hydraulic linkages are necessary from the cab to other areas.

2. Power steering apparatus for a vehicle having a cab, a steering wheel and steered wheels comprising:
   means (PPS, SA) communicating with said steered wheels for sensing changes of position of said steered wheels and for producing an electrical first signal related thereto;
   an electric dynamo (DCM) in the cab having an armature and a movable shaft (MS), and receiving armature current for providing torque for setting and holding the position of its shaft;
   means (G, SS) for coupling the torque from said dynamo shaft to the steering wheel to provide a reaction torque to oppose torque applied to the steering wheel by a driver;
   means (SPS) communicating with said steering wheel for sensing changes of position of said steering wheel and for producing a second signal related thereto;
   comparison means (SA) receiving said first and second signals for providing a demand signal dependent upon their difference;
   first means (TDA etc.) receiving said demand signal and responsive to it for applying to the steered wheels a torque based upon said demand signal;
   second means (MD) receiving said demand signal and responsive to it for providing said armature current to said dynamo for controlling said torque of said dynamo shaft.

3. Power steering apparatus for a vehicle having a cab, a steering wheel and steered wheels comprising:
   means (PPS, SA) communicating with said steered wheels for sensing changes of position thereof and for providing a countable electrical first signal indicative of said changes;
   an electric dynamo (DCM) in the cab having an armature and a movable shaft (MS), and receiving armature current for providing torque for setting and holding the position of its shaft;
   means (G, SS) for coupling the torque from said dynamo shaft to the steering wheel to provide a reaction torque to oppose torque applied to the steering wheel by a driver;
   means (SPS) communicating with said steering wheel for sensing changes of position of said steering wheel and for producing a countable second signal indicative of changes of said steering wheel position;
   comparison means (SA) receiving said first and second signals for counting them and providing a demand signal dependent upon their difference;
   first means (TDA etc.) receiving said demand signal and responsive to it for applying to the steered wheels a torque based upon said demand signal;
   second means (MD) receiving said demand signal and responsive to it for providing said armature current to said dynamo for controlling said torque of said dynamo shaft.

4. Power steering apparatus as in claim 3 and further comprising means for resetting said comparison means to a starting status upon cessation and application of power, whereby neither the steering wheel nor the steered wheels moves initially upon startup.

5. Power steering apparatus as in claim 3 and wherein:

said means for providing each of said first and second signals comprises a movable mechanical element and sector transition boundaries and means for providing a sensor signal when said element moves across a sector transition boundary; and, said means receiving said first and second signals for counting said first and second signals them comprises means for preventing counting of a spurious extraneous sensor signal occurring when said means for providing said first and second signals moves back and forth undesirability about a sector transition boundary.

6. Power steering apparatus as in claim 5 and wherein:

said means for providing first and second signals further comprises means for providing (a) direct signals and (b) offset signals having a predetermined phase offset from said direct signals, for enabling differentiation between rightward and leftward motion of said element on the basis of relative phase between the direct and offset signals; and, said means receiving said first and second signals for counting them further comprises means for converting a direct and offset pair of said signals to a signal for counting upward or a signal for counting downward depending upon said relative phase between the direct and offset signals; and, said means for converting comprises:

first flip-flop means having a first data input terminal connected to receive said direct signal, a first clock terminal, and a first output terminal connected with said counting means for providing thereto an up-signifying signal for incrementing said counting means;

second flip-flop means having a second data input terminal connected to receive said offset signal, a second clock terminal, and a second output terminal connected with said counting means for providing thereto a down-signifying signal for decrementing said counting means;

first exclusive OR means having an output connected with said first clock terminal for clocking data from said first data terminal to said first output terminal, and having an input connected with said first output terminal, and another input connected to receive said offset signal; and, second exclusive OR means having an output connected with said second clock terminal for clocking data from said second data terminal to said first output terminal, and having an input connected with said second output terminal, and another input connected to receive said direct signal.

* * * * *